COMBINED TRANSCEIVER AND RADIO BROADCAST RECEIVER

Filed Aug. 2, 1963 4 Sheets-Sheet 1

INVENTOR.
IORI KOBAYASHI

BY Kurt Kelman

AGENT

INVENTOR.
IORI KOBAYASHI
BY
Kurt Kelman
AGENT

INVENTOR.
IORI KOBAYASHI
BY
Kurt Kelman
AGENT

Oct. 4, 1966 IORI KOBAYASHI 3,277,374
COMBINED TRANSCEIVER AND RADIO BROADCAST RECEIVER
Filed Aug. 2, 1963 4 Sheets-Sheet 4

INVENTOR.
IORI KOBAYASHI
BY
Kurt Kelman
AGENT

United States Patent Office 3,277,374 Patented Oct. 4, 1966

3,277,374
COMBINED TRANSCEIVER AND RADIO BROADCAST RECEIVER

Iori Kobayashi, Tokyo, Japan, assignor to Masatoshi Shimada, Tokyo, Japan

Filed Aug. 2, 1963, Ser. No. 299,646
Claims priority, application Japan, Sept. 24, 1962, 37/40,992
10 Claims. (Cl. 325—18)

The present invention relates to an improved combination of a radio receiver and a transceiver particularly for receiving a program on the former while holding the latter in readiness for a call.

Where a transceiver, which may operate on the so called citizen's frequency band, is used during recreation or leisure, for example, it is convenient to be able to operate a radio receiver for entertainment program reception, since the transceiver contact or operating time is very short and intermittent. It is not convenient, however, while listening to the radio receiver to switch repeatedly to the transceiver, or pay sufficient attention thereto so as not to miss a contact call from a partner's transceiver. If the transceiver output is impressed on the receiver's loudspeaker, a call from a partner's transceiver may be drowned out by a loud signal from the receiver. It is one object of the invention to overcome this difficulty by reducing the gain of the receiver by means of the transceiver's output.

It is another object of the invention to enable a radio receiver, associated with a transceiver, to be operated with a minimum amount of interruption, and yet provide great safety against missing a desired call signal from another transceiver.

In general, it is an object of the invention to provide efficient and effective operation of a radio receiver and transceiver which are combined and have common elements.

Other advantages and features of the invention will be apparent from the following description and the accompanying drawing wherein.

Figure 1:
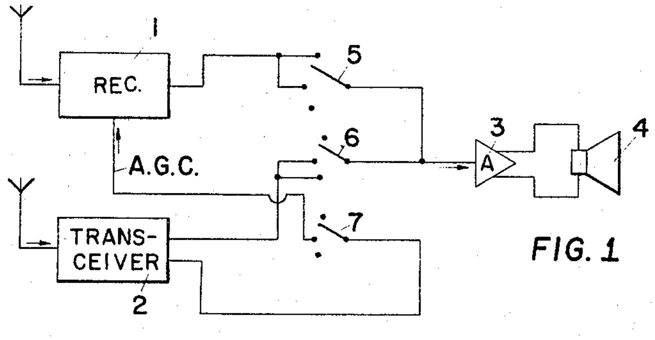
FIGS. 1, 2, 4, 7, 8 and 9 are block diagrams illustrative of various embodiments of the invention.

Referring to the drawing, a receiver 1 and transceiver 2 are connected to a low frequency or audio amplifier 3 and loudspeaker 4 through switches 5, 6, 7. It is evident that the switches can connect the receiver, or transceiver, or both, to amplifier 3. When only the receiver or transceiver are connected, the power for the other will be switched off, preferably, but for the sake of simplicity, the additional switches for this purpose are not shown, and neither is the conventional press-to-talk switch of the transceiver. In the middle position of the switches, switch 7 connects a direct current voltage from transceiver 2 to receiver 1 for controlling the gain of an amplifier thereof. This gain control voltage is obtained by rectifying a signal received by the transceiver. Thus, when a partner's transceiver is switched on, the gain of receiver 1 is reduced and then, as the call arrives at transceiver 2, it is impressed on the loudspeaker and heard. If necessary, the automatic gain control (A.G.C.) voltage may be amplified before being applied to a control grid or transistor electrode of the controlled amplifier of receiver 1.

One disadvantage of the system of FIG. 1 is that noise output of the receiver portion of transceiver 2 is superimposed on the output of receiver 1. This fault is overcome in the system of FIG. 2, wherein amplifier 8 is connected between the output of transceiver 2 and amplifier 3. The gain of amplifier 8 is increased by a voltage supplied over lead 8' when a signal is received by transceiver 2, and the output of the transceiver is then supplied via amplifiers 8 and 3 to loudspeaker 4, while the output of receiver 1 is suppressed by the gain control voltage supplied thereto through switch 7. When no signal occurs at the transceiver, amplifier 8 is cut off and receiver 1 supplies signals to amplifier 3 with unreduced gain. Thus the noise output of transceiver 2 is not added to the output of receiver 1 when no signals are being received by the transceiver.

Figure 2:
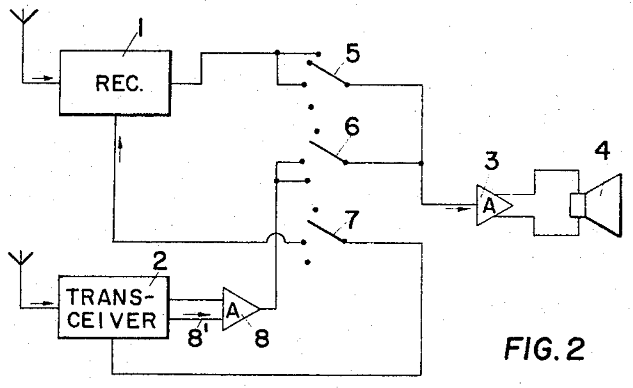
Figure 3:
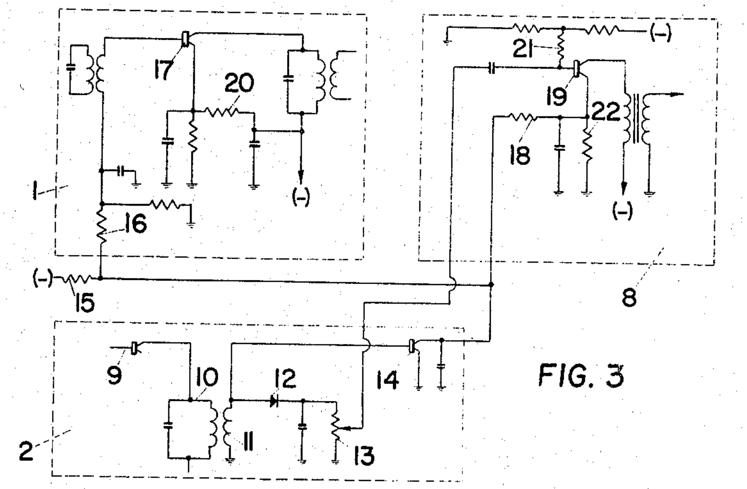
FIG. 3 is a circuit diagram of a portion of the system of FIG. 2.

FIG. 3 shows a portion of the circuitry of the system of FIG. 2. The last transistor stage 9 of the I.F. amplifier of transceiver 2 is indicated as having a resonant circuit 10 and secondary winding 11. The latter is connected to a detector 12 and volume controller 13, from which audio signals are supplied to the base of transistor 19 of amplifier 8. Voltage across winding 11 is also impressed on the base of control transistor 14. The collector of transistor 14 is supplied with a negative voltage through resistor 15. The collector of transistor 14 controls the current supplied through resistor 16 to the base of transistor 17 of a radio or I.F. amplifier of receiver 1. The collector of transistor 14 is also connected through resistor 18 to resistor 22 to bias the emitter of transistor 19. The base of transistor 19 is biased by circuit 21.

When a received signal is applied to the base of transistor 14, its collector passes current and the collector resistance drops to a value of the order of 100 ohms. If the value of resistor 15 is relatively large, say 10K, the collector voltage drops to nearly zero volts. The base of transistor 17 is then at nearly zero bolts, while its emitter is biased negatively through resistor 20, causing cut off of transistor 17. On the other hand, transistor 19 is now biased for conduction. If the signal should disappear or the carrier fade out in transceiver 2, then transistor 14 would develop a high collector resistance and a sufficient bias would be applied through resistors 15 and 18 across resistor 22 to cut off transistor 19. Thus the operation described in connection with FIG. 2 is effected.

In the systems of FIGS. 1 and 2, there is a possibility that speech modulated waves or a call signal other than the desired one will interfere with the reception of receiver 1, when received by transceiver 2.

Figure 4:
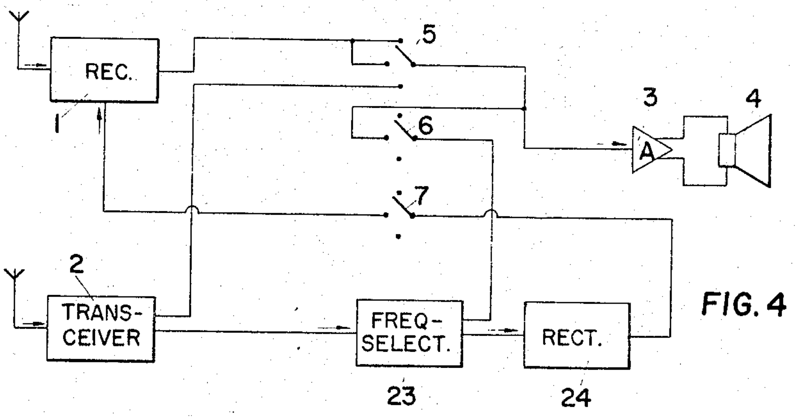

FIG. 4 shows a system for eliminating the above mentioned fault. In the first and third positions of switches 5–7 receiver 1, or transceiver 2, alone, is connected to amplifier 3. The call signal received at transceiver 2 from a desired transceiver has a constant tone frequency generated, for example, by an oscillator in said other transceiver, called the partner's The received call signal is fed to a signal selector 23, which may be a resonant LC circuit or a tuned reed circuit. In the middle position of switches 5–7 the call signal output of frequency selector 23 is fed through switch 6 to amplifier 3, while another portion of the output of selector 23 is impressed on rectifier 24 and fed through switch 7 to reduce the gain of receiver 1. Thus the call signal alone may be heard. By making selector 23 sharply tuned to the frequency of the call signal, interference due to other call signals can be overcome.

Figure 5:
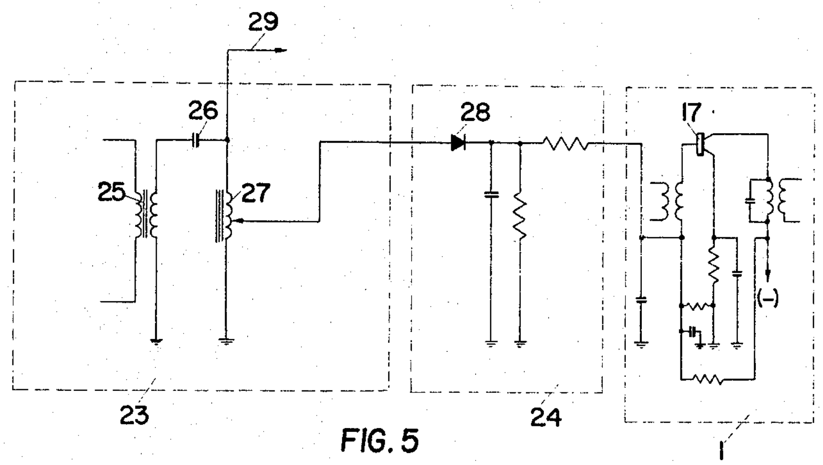
FIGS. 5 and 6 are circuit diagrams of the signal selector and receiver gain control apparatus of FIG. 4.

FIG. 5 shows the circuitry of elements 23 and 24 particularly. The detected low frequency output of transceiver 2 is impressed by transformer 25 on series resonant circuit 26, 27. A portion of the resonant circuit output is rectified by rectifier 28 in circuit 24 and the rectified voltage is applied as a bias to the base of transistor 17 of receiver 1, to cut it off in response to a proper call signal. The call signal is also supplied from resonant circuit 26, 27 via conductor 29 to switch 6 to FIG. 4, whence it is supplied to amplifier 3 and loudspeaker 4, so that the call signal tone may be heard.

Figure 6:
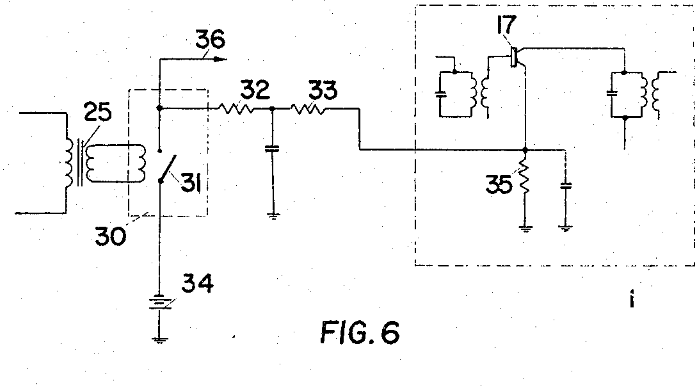

FIG. 6 shows an example of a tone frequency selector of the tuned reed type. Here, again, transformer 25 energizes the driving coil of tuned reed selector 30 having switch contacts 31 connecting current source 34 through resistors 32, 33 to biasing circuit 35, for biasing the emitter of transistor 17 in receiver 1. The signal output appears at 36. When the call signal arrives, tuned reed 31 causes intermittent closing of its contacts and the resultant current supplied to bias circuit 35 causes the gain of transistor 17 to be reduced rapidly.

Although in the above described embodiments reference was made particularly to controlling the gain of the I.F. amplifiers of receiver 1, it is evident that the receiver gain, or receiver cut off, in response to a transceiver signal can be effected in other ways, such as controlling an audio frequency amplifier or by a relay or electronic switch.

Figure 7:
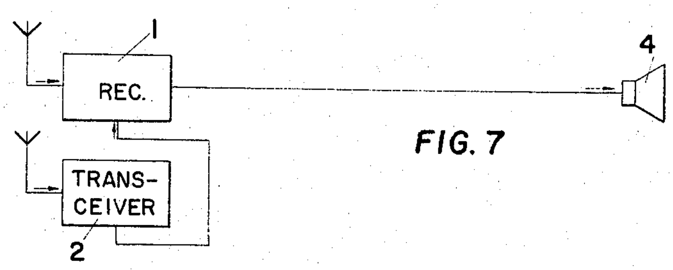
Figure 8:
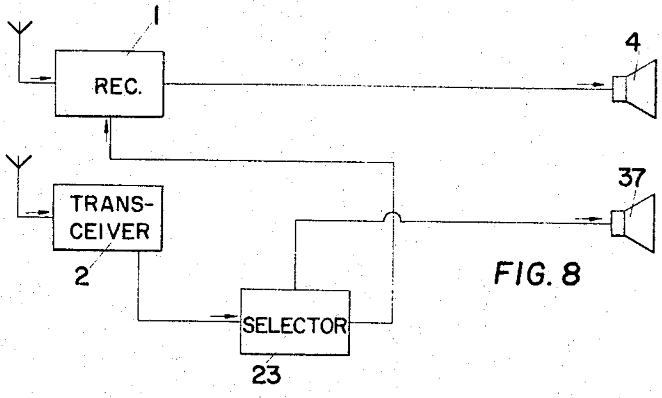
Figure 9:
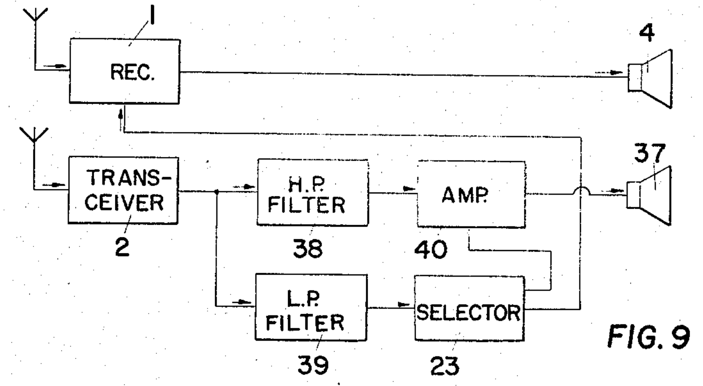

FIG. 7 shows only a portion of a system, the change-over switches being omitted. The gain of receiver 1 is shown as being controlled by signals received by transceiver 2. When the same carrier frequency is used by many stations, the output of receiver 1 may be interrupted repeatedly when the other stations are communicating with one another. This difficulty is overcome by the circuit of FIG. 8. Here the output of transceiver 2 is fed to a signal selector 23 tuned to receive only the frequency of the desired call signal. The output of selector 23 is fed to loudspeaker 37. The output of receiver 1 is reduced by the desired call signal as it passes through selector 23 to the receiver, permitting the call signal to be heard in loudspeaker 37. After receiving the call signal loudspeaker 37 is switched to the ouput of transceiver 2 by switching means which are not shown in this figure. When the call signal ends, the output of loudspeaker 14 increases, and this may disturb talking over the transceiver. Accordingly, in the system of FIG. 9 a frequency outside the 300-2700 c.p.s. range is used as the call signal frequency, and only 300-2700 c.p.s. frequencies are used for voice. The output of transceiver 2 is impressed on L.P. filter 39, which passes frequencies below 300 c.p.s. The selector 23 responds to frequencies below 300 c.p.s. and its output increases the gain of amplifier 40 and reduces the gain of receiver 1. Voice frequences above 300 c.p.s. pass high pass filter 38, are amplified by 40 and supplied to loudspeaker 37. As the call signal frequency is transmitted continuously during talking, the loudspeaker 4 output is reduced so that it does not interfere with talking over the transceiver. Likewise, the call signal does not interfere with transceiver talking since the call signal is blocked by filter 38 from loudspeaker 37. When frequencies above 2700 c.p.s. are used for the call signal, filter 38 is made to be low-pass and filter 39 is made high-pass. When there is no desired call signal, the gain of receiver 1 is increased and the gain of amplifier 40 and the output of loudspeaker 37 are reduced, so that talking between other stations is not heard on transceiver 2 and loudspeaker 37.

What is claimed is:

1. In combination, a transceiver having a receiver portion providing an output terminal and tunable to a signal from another transceiver, a radio broadcast receiver having an output terminal, a signal selecting device connected to said transceiver output terminal and selectively responsive to a prescribed calling signal, said selecting device having a selective A.C. output and a selective D.C. output, circuit means including sound reproducer means, means for applying said A.C. output to said circuit means as a selective calling signal, a gain control circuit for said broadcast receiver, means for applying said D.C. output to said gain control circuit for controlling the gain of said broadcast receiver, and means for connecting the output terminal of said broadcast receiver with said circuit means while said A.C. output is connected with said circuit means.

2. The apparatus of claim 1 wherein said signal selecting device includes a resonant circuit and provides frequency selective A.C. and D.C. outputs.

3. The apparatus of claim 1 wherein said signal selecting device includes an electromagnetically vibrating member having a natural frequency energized by the output of said transceiver receiver portion, providing frequency selective A.C. and D.C. outputs.

4. The apparatus of claim 1 wherein said broadcast receiver includes an amplifier circuit connected to and controlled by said gain control circuit.

5. The apparatus of claim 1 wherein said gain control circuit reduces the output of said broadcast receiver substantially to zero in response to said prescribed calling signal.

6. The apparatus of claim 1 wherein said sound reproducer means is a single speaker.

7. In combination, a transceiver having a receiver portion providing an output terminal and tunable to a signal from another transceiver, a radio broadcast receiver having an output terminal, a signal selecting device connected to said transceiver output terminal and selectively responsive to a prescribed calling signal, said selecting device having a selective A.C. output and a selective D.C. output, circuit means including sound reproducer means, means for applying said A.C. output to said circuit means as a selective calling signal, a gain control circuit for said broadcast receiver, means for applying said D.C. output to said gain control circuit for controlling the gain of said broadcast receiver, multiple switching means having a first position connecting the output of said broadcast receiver only to said sound reproducer means, a second position connecting the output of said broadcast receiver and said A.C. output to said sound reproducer means, and a third position connecting said transceiver output terminal only to said sound reproducer means.

8. The apparatus of claim 7 wherein said switching means includes means interrupting power to said transceiver in said first switch position and means interrupting power to said broadcast receiver in said third switch position.

9. The apparatus of claim 7 wherein said switching means includes means connecting the D.C. output of said selecting device to said gain control circuit in said second switch position.

10. In combination, a transceiver having a receiver portion providing an output terminal and tunable to a signal from another transceiver, a radio broadcast receiver having an output terminal, a signal selecting device connected to said transceiver output terminal and selectively responsive to a prescribed calling signal, said selecting device having a selective A.C. output and a rectifier providing a selective D.C. output, circuit means including sound reproducer means and switching means selectively connecting said reproducer means with said transceiver receiver and said broadcast receiver, and gain control means connected to said D.C. output and said broadcast receiver for controlling the output of said broadcast receiver in response to a calling signal.

References Cited by the Examiner

UNITED STATES PATENTS

| | | | |
|---|---|---|---|
| 2,330,241 | 9/1943 | Roberts | 325—303 X |
| 2,435,061 | 1/1948 | Turkat | 325—64 X |
| 2,938,206 | 5/1960 | Davis et al. | 325—303 X |

DAVID G. REDINBAUGH, *Primary Examiner.*

J. W. CALDWELL, *Assistant Examiner.*